INVENTOR
QUENTIN R. SEARLE
BY
ATTORNEY

United States Patent Office 3,394,783
Patented July 30, 1968

3,394,783
MAGNETIC FLUID COUPLING
Quentin R. Searle, Amherst, N.H., assignor to Vibrac Corporation, Chelmsford, Mass., a corporation of Massachusetts
Filed Mar. 11, 1966, Ser. No. 533,539
11 Claims. (Cl. 192—21.5)

ABSTRACT OF THE DISCLOSURE

Magnetic devices of the type employing magnetic particles for coupling a drive member to a driven member, characterized by the provision of grooves located and sized so as to minimize perturbations in transmitted torque, particularly at relatively low rotational speeds.

---

This invention relates to magnetic devices and more particularly to torque transmitting devices of the type employing magnetic particles for coupling a drive member to a driven member.

Magnetic particle torque transmitting devices of various types are known to the art. Most commonly they are constructed to function as electrically controlled clutches and include a first shaft on which two driving armature members are cooperatively mounted, a second shaft carrying a driven member in the form of a disc that is disposed between the two driving members, magnetic particles in the space between the driving and driven members, and a coil operative when energized to establish a magnetic field axially across the driving and driven members so that the magnetic particles will lock into chains coupling the driving and driven members together to the extent that rotation of the driving members tends to cause rotation of the driven member. Electrically controlled brakes are another type of magnetic particle device to which the present invention relates. These differ from clutches in that the two cooperatively mounted armatures are locked against movement and the applied magnetic field operates to oppose relation of the disc relative to the armatures. Both of the foregoing type of devices are shown in U.S. Patent 3,208,567, issued Sept. 28, 1965, to Louis G. Metzger for "Reversible Magnetic Particle Clutch and Brake with Cooling Means." Still another type of magnetic particle torque transmitting device to which the present invention relates is a magnetic tensioner for imparting drag to a rotatable member. Such a device is illustrated and described in the copending U.S. patent application of Raymond W. Searle and Robert F. Searle, Ser. No. 511,631, filed Dec. 6, 1965, for "Magnetic Device." This type of tensioner comprises a rotatable shaft with a disc thereon, two stationary armature members on opposite sides of the disc, means containing magnetic particles between the disc and the stationary members, a permanent magnet having a magnetic field directed across the disc and the stationary members so as to couple them by way of the particles, and means for movably adjusting the position of the magnet so as to vary the influence of its field across the disc and the stationary members. Magnetic particle devices of the foregoing types have many applications and offer many advantages. One primary advantage resides in the ability to adjust the output torque over a relatively wide range. The output torque is controlled by the degree of slip of the magnetic particles which in turn is a function of the effective strength of the applied magnetic field. A second primary advantage is the proven ability to operate in the slip condition for long periods of time without failure. A third advantage is that efficient and rugged devices can be constructed in relatively small sizes.

However, there has been difficulty with devices of these types in obtaining a substantially smooth output torque with no oscillations or perturbations ofa substantial amplitude, particularly at relatively low shaft speeds, e.g., 20–40 revolutions per minute. For many applications it is essential that perturbation in torque output be as little as 4–5 parts per thousand, e.g., no more than .5 oz.-in. deviation at an output torque level of about 100 oz.-in.

Accordingly the primary object of this invention is to provide means for minimizing the revolution to revolution torque perturbation of magnetic particle torque transmitting devices.

A more specific object of this invention is to provide magnetic devices of the type described above that embody means that coact with the magnetic particles to attain a smooth output torque with little or no perurbations.

I have discovered that perturbations in output torque can be substantially eliminated by providing a plurality of radially extending slots in the adjacent faces of the two armatures on opposite sides of the driven member. Previously it has been suggested that operation of a magnetic particle clutch may be improved by modifying the faces of the driving and driven members. Thus U.S. Patent 3,208,567, issued Sept. 28, 1965 to Louis G. Metzger for "Reversible Magnetic Particle Clutch and Brake With Cooling Means" suggests two alternative modifications for two different results. One modification is to make axially extending slots in portions of the armature traversed by the magnetic flux and to fill these slots with a plastic filler or preferably to cover them with a steel disc cemented to the armature by an adhesive insulating film that prevents the disc from short-circuiting the slotted sections of the armature. The purpose of this particular modification is to supress eddy currents. The second modification suggested by Meltzger is to radially knurl the faces of the driving and driven mmebers so as to provide a number of discontinuous surfaces. The purpose of this alternative modification is to improve and accentuate the coupling effect. However, it has been determined that merely providing surface discontinuities does not solve the problem to which the present invention is directed; radial knurling has negligible effect and other types of discontinuities actually worsen the problem. For example it has ben found that certain arrangements of grooves in the adjacent faces of the rotatable elements give rise to an impeller type pumping action vis-a-vis the magnetic particles and this action manifests itself by a sinusoidal or pulsating variation in torque output. However, I have discovered that if a sufficient area of the adjacent faces of the two armatures is slotted radially and if the slots on one face are offset from the slots on the other face, the torque output will remain substantially flat in the slip condition, with revolution to revolution perturbations occurring rarely and then providing a torque variation of no greater than .1 to .3%.

Other objects and many of the attendant advantages of the present invention will become more readily apparent from the following detailed specification when considered together with the accompanying drawings, wherein.

Figures 1, 2, 3:
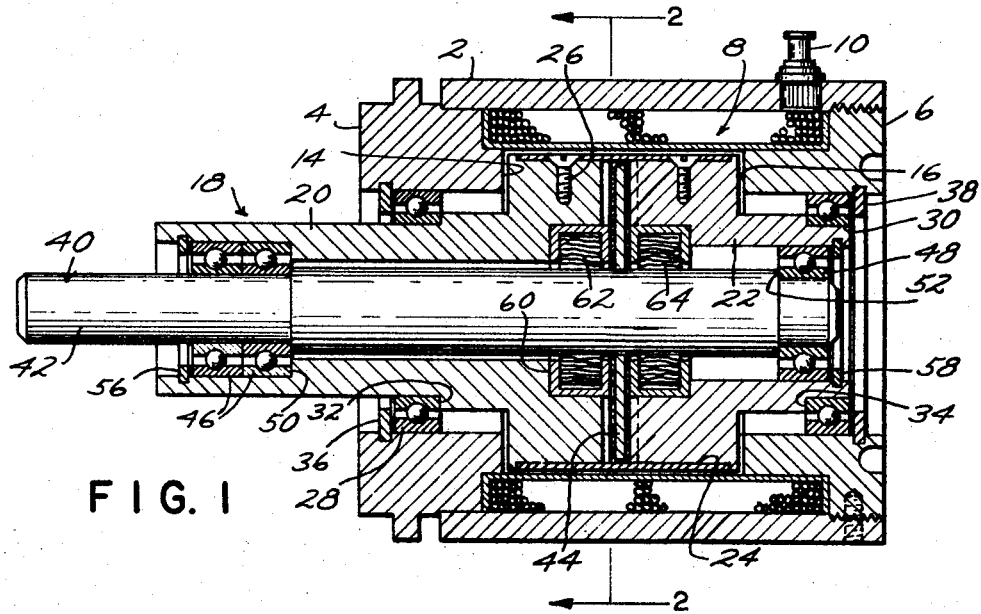
FIG. 1 is a longitudinal sectional view of a magnetic particle clutch constituting a preferred embodiment of my invention.
FIG. 2 is a sectional view taken along line 2—2 of FIG. 1.
FIG. 3 is an enlargement of a portion of FIG. 1.

Turning now to FIG. 1, there is illustrated a magnetic particle clutch consisting of a stationary field coil and rotatably mounted input and output shaft assemblies. More particularly the clutch consists of housing made up of a cylindrical shell 2 fitted with annular end members 4 and 6. Secured between the shell and the two end members is a coil assembly 8 of conventional construction. The ends of the coil are adapted for coupling to an external power source by a pair of suitable terminals secured to shell 2, one of such terminals being shown at 10. The shell 2 as well as the end members 4 and 6 are made of magnetic material, with the inner transversely extending faces 14 and 16 of end members 4 and 6 respectively functioning as poles to develop a magnetic field through adjacent portions of the output shaft assembly which is identified generally by numeral 18.

The output shaft assembly comprises two driving members 20 and 22 that are formed of magnetic material so as to function as armatures. These members are connected to each other by a sleeve 24 made of non-magnetic material. The sleeve is secured to the two driving members by means of screws 26. The two driving members 20 and 22 are rotatably supported by means of bearings 28 and 30, the positions of which are defined by shoulders 32 and 34 and snap-type retainer rings 36 and 38.

Rotatably supported by the input shaft assembly 18 is an output shaft assembly identified generally by numeral 40. The output shaft assembly comprises a shaft 42 constructed of non-magnetic material and carrying a disc 44 made of magnetic material. The disc 44 is secured to the output shaft 42 in a suitable manner, as by press fitting, and extends radially outwardly of the shaft between the two driving members 20 and 22 of the input shaft assembly 18. The output shaft assembly is rotatably supported by the input shaft assembly by means of bearings 46 and 48, the positions of which are defined by shoulders 50 and 52 on shaft 42 and by retainer rings 56 and 58 which snap into grooves formed in the driving members 20 and 22. The ends of driving members 20 and 22 confronting disc 44 are provided with circular grooves 60 to accommodate shaft seals 62 and 64 of conventional design. These shaft seals define together with sleeve 24 an annular space between disc 44 and the driving members 20 and 22, which space is filled with dry magnetic particles 66 (see FIG. 3).

To the extent already described the foregoing structure is conventional. When the coil 8 is energized, a magnetic field is established across the particles 66 through the high permeability material of the end members 4 and 6, the driving armature members 20 and 22, and the driven disc 44. With such flux linkage across the magnetic particles, the latter will lock in chains between driving members 20 and 22 and disc 44, thereby coupling the input shaft assembly 18 with the output shaft assembly 40. Generally the energized clutch is operated such that the output shaft assembly 40 rotates more slowly than the input shaft assembly 18. This is known as operating in the slip condition and involves shearing of the magnetic bonds within the powder. The transmitted torque is controllable by varying the strength of the magnetic field, and thereby the degree of slip. The clutch may be operated at any desired torque level or between any two or more torque levels by selection of appropriate energizing currents. Such a clutch is characterized by extremely fast response with the response time being substantially independent of rotational speed and substantially unaffected by the direction of rotation of the rotatable shaft assemblies. Notwithstanding these advantages, clutches constructed as described above have been found to be subject to perturbations in transmitted torque, particularly at relatively low shaft speeds in the order of 20–40 revolutions per minute. These perturbations are substantially eliminated by the present invention. This improvement will now be described.

Referring now in particular to FIGS. 2 and 3, the inner end faces 68 and 70 of the driving members 20 and 22 are provided with a plurality of equally spaced radially extending slots 72 and 74 respectively that are exposed to magnetic particles 66. In the illustrated embodiment each of the faces 68 and 70 is provided with twenty-four slots of square cross-section. These slots extend from the periphery of the driving members 20 and 22 to circular grooves 60. Although in the illustrated embodiment seals 62 and 64 are flush with faces 68 and 70, it is to be understood that in practice grooves 60 may be made sufficiently deep to permit seals 62 and 64 to be flush with the bases of slots 72 and 74, in which event a portion of each slot 60 will function as a terminus for all of the slots formed in that particular driving member and is filled with magnetic particles 66.

It has been found that the number and arrangement of these slots (and to a lesser extent, their sizes also) determines the extent to which they effectively eliminate the problem of perturbations in transmitted torque. At least 20% and preferably at least 30% of the total surface area of each of the faces 68 and 70 must be slotted. Furthermore the total number of slots in each face should equal at least about eight and preferably about twenty-four. With less than about eight slots there is little or no reduction in the rate of occurrence or size of perturbations in output torque level. The perturbations diminish as the number of slots is increased above eight.

In general optimum results are attained with about 20–24 slots. Increasing the number of slots above 24 produces no perceptible improvements with servo-size devices, that is, devices with a housing having a length in the range of about 0.9 to 3.5 inches and an outside diameter in the range of about 0.5 to 2.0 inches. It is possible that with larger size devices more than 24 slots may provide better results.

A further critical aspect of the invention is that slots 72 in driving member 20 must be offset with respect to slots 74 in driving member 22. It has been found that if the slots in one driving member are in direct opposition to the slots in the driving member, perturbations will occur almost as if no slots at all were present. The perturbations diminish as the slots in one driving member are rotated so as to coincide less and less with the slots in the second driving member, with minimum perturbations occurring when the slots in one driving member are 180° out of phase with those in the other driving member, i.e., when each slot 72 is lined up exactly midway between two slots 74.

The slot size is critical to the extent that cross-sectional area should be at least several orders of magnitude greater than the particle size cross-section (in servo-size devices the magnetic particles generally are of micron size and I prefer to use particles with a size in the order of 15 microns). Preferably the slots are of square cross-section, but they also may have a rectangular cross-section or be V-shaped or semi-circular. I also prefer, although it does not appear absolutely necessary, that the depth of slots 72 and 74 be greater than the gap between the driven disc 44 and the adjacent faces 68 and 70 of the two driving members. In this connection it is to be noted that disc 44 generally is equally spaced with respect to the two driving members.

By way of example, in one typical clutch embodying the construction shown in FIGS. 1–3, the faces 68 and 70 of driving members 20 and 22 each had a total surface area of about 0.5 square inch, of which about 0.1 square inch was slotted with radial slots of square cross-section measuring about $\frac{1}{32}$ inch on each side. The powder gap between driven disc 44 and each driving member was approximately 0.010 inch. The extent of improvement of torque output achieved by the present invention is seen from the fact that addition of radial slots to a given clutch in the manner just described resulted in a reduction of perturbation amplitude from 2–3% down to about 0.5% of transmitted torque at different degrees of slip.

A further incidental advantage of the invention is that the slots allow a larger quantity of magnetic particles to be accommodated without increasing the minimum gap distance between the driving members and the driven disc. This greater amount of powder allows a higher torque output to be achieved with the same input currents. The additional powder that can be accommodated due to the slots 70 and 72 does not introduce additional drag on the device.

As an optional feature the disc 44 may be provided with a plurality of holes, such as shown at 78 in FIG. 3, with diameters several orders of magnitude greater than particles 66. These holes 78 help maintain an even distribution of particles on both sides of disc 44, as well as improving the overall coupling effect without introducing perturbation.

The reason why slots 72 and 74 eliminate perturbations in transmitted torque is not exactly clear. It is suggested that one of the reasons why the slots in one driving member must be offset with respect to the slots in the adjacent driving member is so as to provide a uniform magnetic field through the particles. If the slots directly opposed each other, the reluctance between the slots would be substantially greater than the reluctance between the unslotted portions of the two driving members.

Although the invention has been described in detail with reference to a preferred form of clutch, it is to be understood that it also is applicable to other magnetic particle devices, such as brakes or tensioners of the type described and illustrated in the above-mentioned application of Robert F. and Raymond W. Searle, Ser. No. 511,631, where the rotor supports 8 and 16 correspond to driving members 20 and 22. Accordingly the term "magnetic-particle device" is to be construed as embracing brakes and tensioners as well as clutches.

It is to be understood that the invention is not limited in its application to the details of construction and arrangement of parts specifically described or illustrated, and that within the scope of the appended claims, it may be practiced otherwise than as specifically described or illustrated.

I claim:

1. A magnetic particle device comprising a rotatably mounted disc having radially extending opposite side surfaces, first and second armature members disposed on opposite sides of said disc, said members each having a face in spaced confronting relation with a side surface of said disc, said faces being parallel to said disc, means extending between and secured to each of said members and enclosing said disc, magnetic particles positioned between said disc and said members, and means mounted separate from said disc and said members for establishing a magnetic field across said disc and members to lock said particles into coupling relation with said disc and said members, each of said faces having a plurality of radially-extending grooves with a width greater than the maximum dimension of said particles, the grooves in one face being offset from the grooves in the other face by predetermined angles about the axis of rotation of said disc, each of said grooves exposed to and containing a substantial number of said particles, the axial thickness of said armature members being greater than the depth of said grooves so that said grooves extend axially only part way through said armature members.

2. A magnetic particle device comprising a shaft, a disc of magnetic material affixed to said shaft so as to rotate therewith, said disc having opposite side surfaces extending radially of said shaft, first and second hollow members of magnetic material surrounding said shaft on opposite sides of said disc, said first and second members each having an end face in spaced confronting relation with the adjacent side surface of said disc, a third member connecting said first and second members, said third member enclosing said disc and the spaces between said disc and said first and second members, means supporting said shaft for rotation relative to said first, second, and third members, a supply of magnetic particles disposed in the said spaces between said disc and said first and second members, said end faces each having a plurality of circumferentially spaced grooves disposed in an array about the longitudinal axis of said shaft, the grooves in one of said end faces being displaced angularly about said axis with respect to the grooves in the other of said end faces, the axial thickness of said first and second members being greater than the depth of said grooves so that axially said grooves extend only part way through said first and second members, said grooves being exposed to and containing a substantial number of said particles, and means for establishing a magnetic field through said disc and said first and second members to magnetically force said particles into torque-coupling relation with said disc and said first and second members.

3. A magnetic particle device as defined by claim 2 wherein said end faces are parallel with said side surfaces.

4. A magnetic particle device as defined by claim 2 wherein each of said end faces has at least about 8 grooves therein.

5. A magnetic particle device as defined by claim 2 wherein the grooves in each end face are spaced uniformly about said axis.

6. A device as defined by claim 2 wherein said means for establishing a magnetic field comprises a coil adapted to be energized with an electric current, said coil being disposed in surrounding relation to said members and said disc.

7. A magnetic particle device as defined by claim 2 wherein the side surfaces of said disc are substantially smooth.

8. A magnetic particle device as defined by claim 2 wherein said disc has at least one hole therein spaced radially of said axis, said at least one hole being larger than said magnetic particles.

9. A magnetic particle device as defined by claim 2 wherein at least about 20% of the surface area of each of said end faces is grooved and each groove has a cross sectional area greater than the cross sectional area of individual particles.

10. A magnetic particle device as defined by claim 2 wherein the distance between said disc and each of said end faces is less than the width and depth of said grooves.

11. A magnetic particle device as defined by claim 2 wherein the grooves in said one end face are angularly displaced from the grooves in the other end face by an angle equal to about half the angle between adjacent grooves in said other end face.

References Cited

UNITED STATES PATENTS

| | | | |
|---|---|---|---|
| 2,685,947 | 8/1954 | Votrian | 192—21.5 |
| 2,917,707 | 12/1959 | Perry et al. | 192—21.5 X |
| 2,987,153 | 6/1961 | Perry | 192—21.5 |
| 3,208,567 | 9/1965 | Metzger | 192—12.2 |

BENJAMIN W. WYCHE III, *Primary Examiner.*